United States Patent
Raidel, II et al.

(10) Patent No.: US 6,843,490 B2
(45) Date of Patent: Jan. 18, 2005

(54) SUSPENSION BEAM AND BUSH ATTACHMENT ASSEMBLY

(75) Inventors: John Raidel, II, Springfield, MO (US); Bruce Barton, Springfield, MO (US); Jason Klein, Springfield, MO (US); Emmitt Scammahorn, Billings, MO (US)

(73) Assignee: Ridewell Corporation, Springfield, MO (US)

( * ) Notice: Subject to any disclaimer, the term of this patent is extended or adjusted under 35 U.S.C. 154(b) by 20 days.

(21) Appl. No.: 10/211,403

(22) Filed: Aug. 2, 2002

(65) Prior Publication Data

US 2004/0021288 A1 Feb. 5, 2004

(Under 37 CFR 1.47)

(51) Int. Cl.[7] .................................................. B60G 9/02
(52) U.S. Cl. .............................................. 280/124.116
(58) Field of Search .................... 280/124.116, 124.177

(56) References Cited

U.S. PATENT DOCUMENTS

| | | | | |
|---|---|---|---|---|
| 3,841,655 A | * | 10/1974 | Schaeff | 280/124.116 |
| 4,693,486 A | | 9/1987 | Pierce et al. | 280/80 |
| 4,991,868 A | * | 2/1991 | VanDenberg | 280/86.75 |
| 4,995,636 A | * | 2/1991 | Hall et al. | 280/124.116 |
| 5,037,126 A | | 8/1991 | Gottschalk et al. | 280/688 |
| 5,127,668 A | * | 7/1992 | Raidel | 280/124.116 |
| 5,288,100 A | * | 2/1994 | Cherry et al. | 280/86.75 |
| 5,362,095 A | * | 11/1994 | Eveley | 280/86.75 |
| 5,375,871 A | * | 12/1994 | Mitchell et al. | 280/124.116 |
| 5,465,997 A | * | 11/1995 | Heitzmann | 280/124.177 |
| 5,639,110 A | | 6/1997 | Pierce et al. | 280/688 |
| 5,690,353 A | * | 11/1997 | Vandenberg | 280/124.116 |
| 5,791,681 A | * | 8/1998 | VanDenberg | 280/124.116 |
| 5,887,880 A | * | 3/1999 | Mullican et al. | 280/43.18 |
| 6,209,895 B1 | | 4/2001 | Mueller et al. | 280/124 |
| 6,227,554 B1 | | 5/2001 | Mueller | 280/86 |
| 6,471,223 B1 | * | 10/2002 | Richardson | 280/86.5 |
| 6,491,314 B2 | * | 12/2002 | Smith et al. | 280/124.116 |
| 6,508,482 B2 | * | 1/2003 | Pierce et al. | 280/124.116 |

* cited by examiner

Primary Examiner—Faye M. Fleming
(74) Attorney, Agent, or Firm—Lathrop & Gage, L.C.

(57) ABSTRACT

The present invention provides a suspension beam and bush attachment assembly. The assembly comprises a longitudinally extending control arm, a bush eye clamp, and a mounting bracket. The control arm has a bush end, a mid-region, an axle mount formed opposite of the bush end, and one or more fastener bore. The bush eye clamp is transversely mounted to the bush end of the control arm and has a center bore configured for receiving a bush therein and an axial slot biasing the bushing eye clamp open for bush insertion. To securely position the bush within the bush eye clamp, the mounting bracket is affixed to the bushing eye clamp and has one or more fastener bores substantially aligned with the one or more fastener bores of the control arm such that securing a fastener through each of the bores of the bracket and control arm couples the bracket to the control arm and biases the axial slot into a substantially closed position to contact and compress a perimeter of the bush with the bush eye clamp.

9 Claims, 5 Drawing Sheets

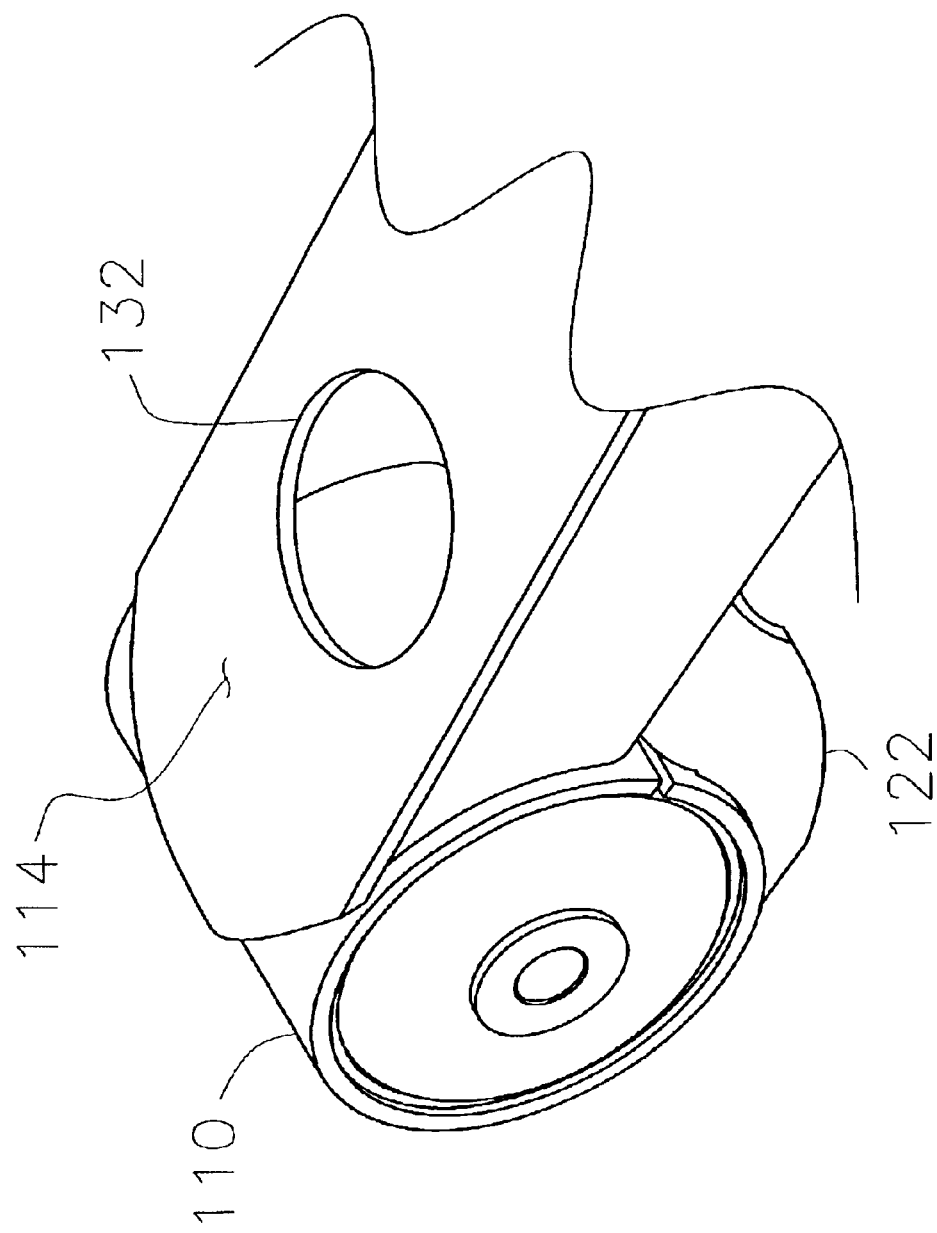

SUSPENSION BEAM AND BUSH ATTACHMENT ASSEMBLY

FIELD OF INVENTION

The present invention is directed vehicles suspension components, and more particularly, to a beam and bush assembly for compression fitting a bush therein.

BACKGROUND OF THE INVENTION

Numerous suspension systems have been designed to attach an axle to a vehicle. Many vehicles employ suspension systems utilizing longitudinally extending trailing beams or rocker beams, also known as control arms. These beams are typically pivotally connected to the vehicle chassis or frame undercarriage at a first end, and attached to a transversely mounted axle at or near a second end. For each axle, one beam is generally located near each of the left and right sides of the vehicle. Often, a suspension member, such as an air spring, leaf spring or coil spring, is positioned between the vehicle chassis and the axle mounting end of the suspension beam. In this configuration, when the vehicle axle encounters a rough surface and is displaced by movement of the tires attached thereto, the suspension member can manage the magnitude and speed of the displacement of the control arm while such beam pivots about the first end pivot connection.

Current trends in axle manufacturing, particularly for large trucks and trailers, are to integrate the axle and suspension system. Generally, unitized systems include axles which are permanently fixed within an end of a suspension control arm and have a resilient pivotal bush at an opposing end of the control arm. The bush, often made from a hyperelastic material, is subject to periodic replacement due to wear and aging. However, unitized systems make bush replacement difficult, and often lead to premature replacement of the entire system when only bush replacement was necessary. Thus, it is desired to have a suspension system providing ease in bush replacement without necessitating the replacement of the whole system, and without requiring the use of specialized tools or equipment. Further, such a system would desirably provide a cost and weight savings over current designs.

DISCLOSURE OF THE INVENTION

The present invention addresses the above described problems and limitations standard in the art by providing a suspension beam and bush attachment system utilizing control arms with an integral bush eye clamp and fastening bracket for easy removal and replacement of a pivot bush.

As is customary in trailing arm suspension applications, the forward end of the control arm is pivotally mounted to a bush assembly and suspended from a hanger assembly attached to the vehicle chassis. The beam then extends rearwardly for connection to a vehicle axle. It is understood that the suspension system includes a pair of spaced apart control arms positioned proximal to each side of the vehicle perpendicular to the transversely extending axle.

Each control arm extends longitudinally along the vehicle and incorporates a bush end, a mid-region, and an axle mount spaced from the bush end by the mid-region therebetween. At the bush end, the bush eye clamp has a generally annular cross-section and is sized to receive a resilient bush for pivotable attachment to the vehicle chassis or a suspension hanger bracket. The bush eye clamp has a transverse slot or gap and it is preferred to be made of steel tubing or rolled sheet. The bush eye clamp is rigidly attached to the suspension beam radially on a fixed end and terminates at the transverse slot to form a free end. In this configuration, the slot is substantially adjacent to a control arm member plate. A mounting bracket is attached to the bush eye clamp proximal to the free end and the transverse slot. The mounting bracket has at least one bore that is aligned with, and opposing, corresponding bores extending through the control arm member plate. The bores of the mounting bracket and control arm are configured to receive a fastener therethrough to rigidly clamp or couple the mounting bracket, and thus the bush eye clamp free end, to the control arm. Preferably, the mounting bracket has a transversely extending flange and includes gussets to minimize flange distortion upon application of clamping forces.

As disclosed, it is desirable to service the bush in an easy and cost effective manner by means of clamping the resilient bush within the bush eye clamp with inexpensive fastening methods. Insertion of the fasteners through the control arm and adjoining mounting bracket provides a simplistic method for clamping the bush. The bush eye clamp transverse slot and corresponding gap formed between the mounting bracket and control arm prior to coupling is predetermined such that upon application of fastener clamping force, adequate compression of the bush is accomplished to prevent slippage of the bush out of the bush eye clamp during vehicle maneuvers. In the event of bush replacement, the fasteners can be easily removed and replaced.

The control arm may take on a variety of shapes, such as a closed or boxed cross-section that has upper and lower member plates and side plates to provide load carrying capability. In this configuration, an aperture is provided in the member plate opposite of the member plate having the fastener bores such that fasteners may be accessed for bush replacement. The control arm may also form a U-channel cross-section to reduce weight and manufacturing assembly time, obviating the need for the member plate aperture.

The present invention provides a control arm and bush attachment assembly that provides ease and inexpensive servicing of the bush. By simply using fasteners to clamp the bush in place, the bush may be quickly exchanged after its normal life is expended without the need of premature replacement of other suspension components. Additionally, by the use of a single mounting bracket to couple the bush eye clamp free end to the control arm and retain the bush therein, the present invention provides a lightweight design that saves material costs as compared to suspension systems employing multiple brackets for bush retention.

BRIEF DESCRIPTION OF THE DRAWINGS

FIG. 5 is an isometric view of the fastener access aperture.

DETAILED DESCRIPTION OF THE PREFERRED EMBODIMENTS

This suspension clamping system is designed for installation on a vehicle, preferably heavy trucks, trailers and commercial equipment, having a pair of substantially parallel chassis side rails. It is understood that the suspension assembly is duplicated on both sides of the chassis with the axle as well as the chassis being similarly connected to both assemblies. Since each bush clamp assembly is identical, only a single assembly will be described.

Figure 1:
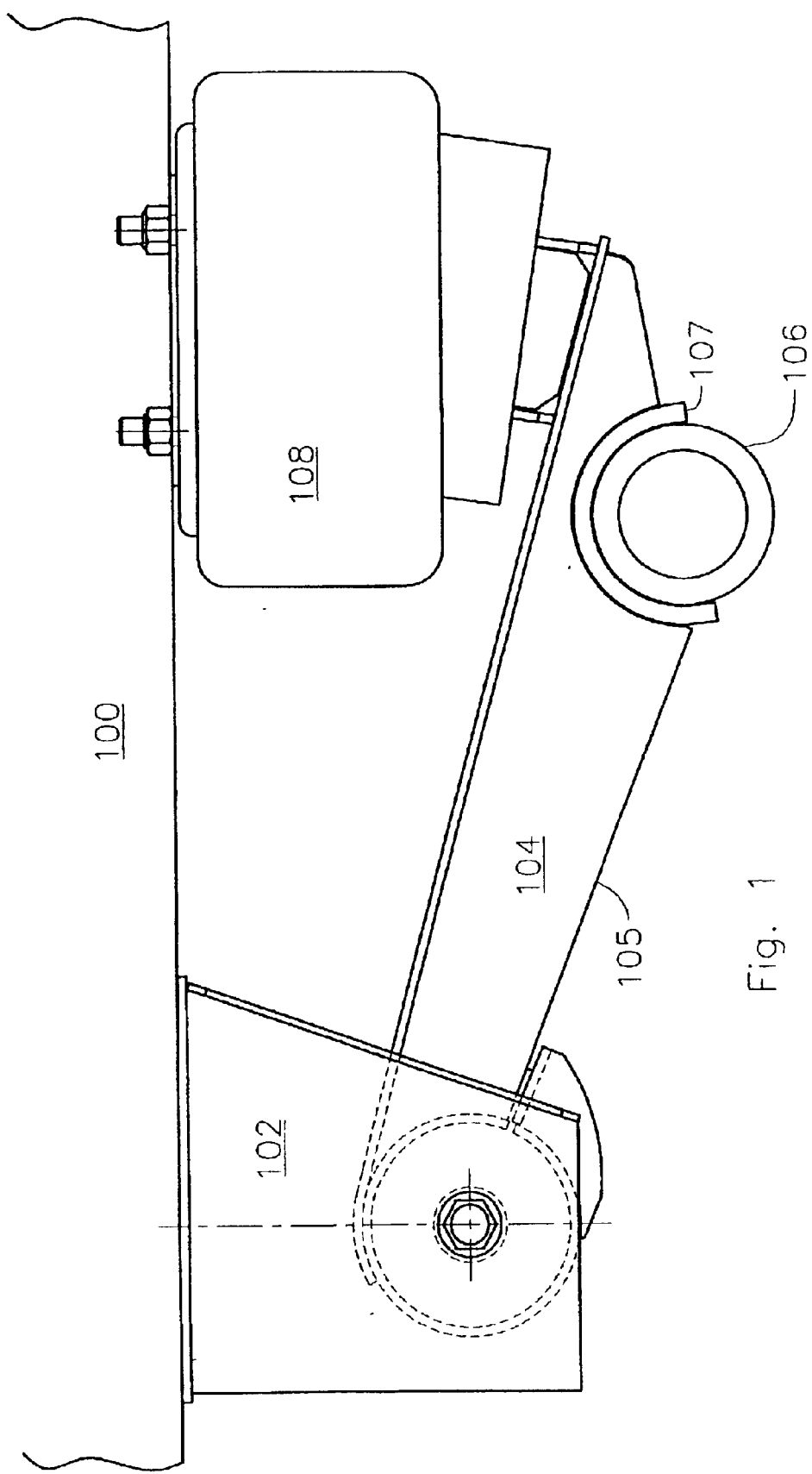
FIG. 1 is a side view of a vehicle suspension system showing the hanger, suspension beam, axle and spring member.

Referring now to FIG. 1, a typical hanger bracket 102 is shown attached to a vehicle chassis rails 100. A suspension beam 104, or control arm, extends longitudinally from the hanger bracket 102 along a mid-region 105 and attaches with an axle mount 107 to a spaced-apart axle 106, preferably by welding. Air spring 108, or a similar spring mechanism, mounts substantially above the suspension beam arm at its most rearward position and to the vehicle chassis rail 100. In operation, as the vehicle axle 106 and attached control arm 104 are displaced, the air spring 108 will deflect and absorb the shock of the control arm movement while the control arm 104 simultaneously pivots about the hanger bracket 102. The control arm 104 can have various cross-sectional shapes, such as a closed cross-section (e.g., circular or boxed), or an open cross-section such as a U-shape. Preferably the control arm 104 is a closed-cross section and has a tension member 114, adjacent suspension side members 112, and a beam member plate 130.

Figure 2:
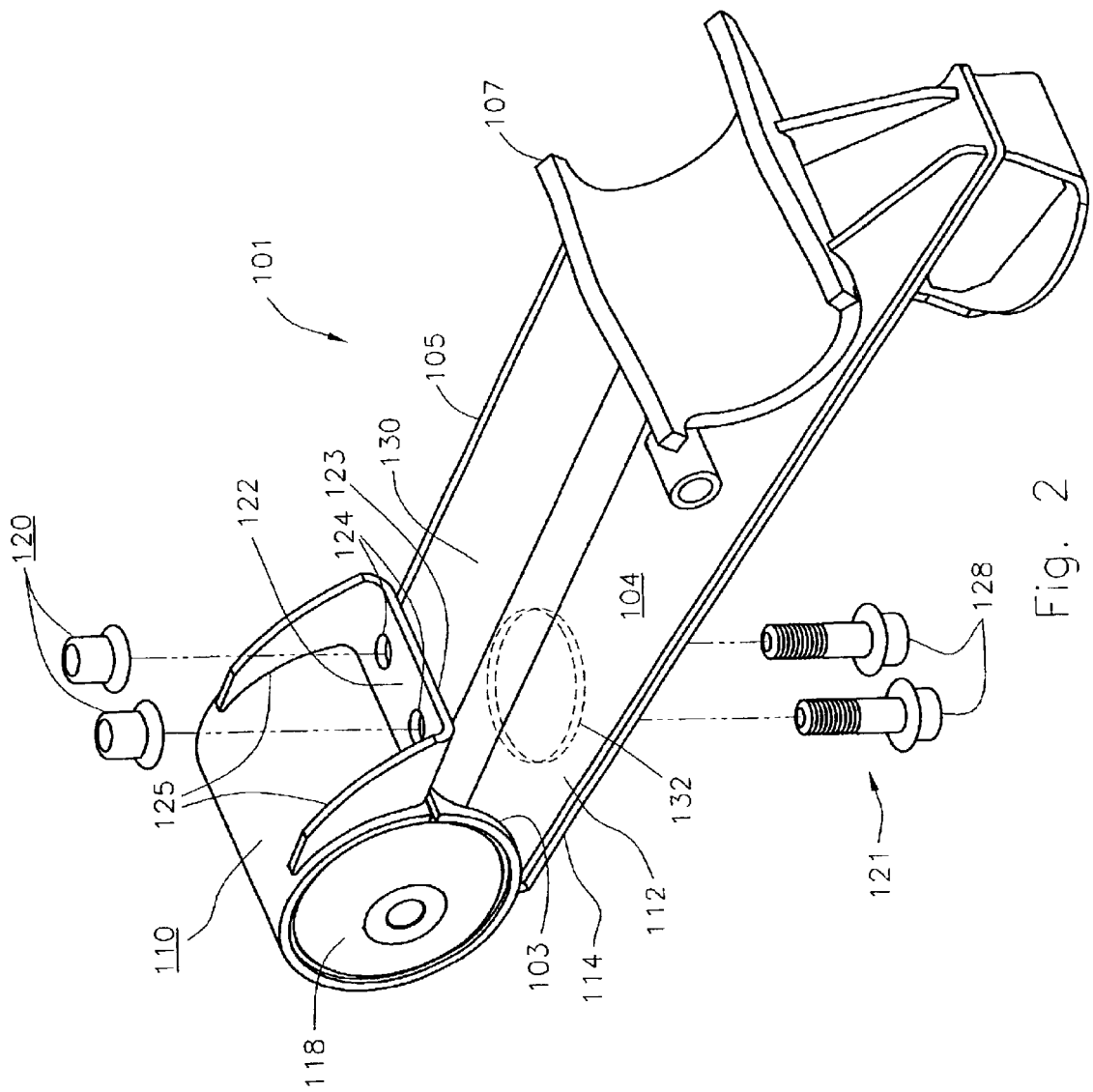
FIG. 2 is an inverted isometric view of the assembled parts of an embodiment of the present invention.
Figure 3:
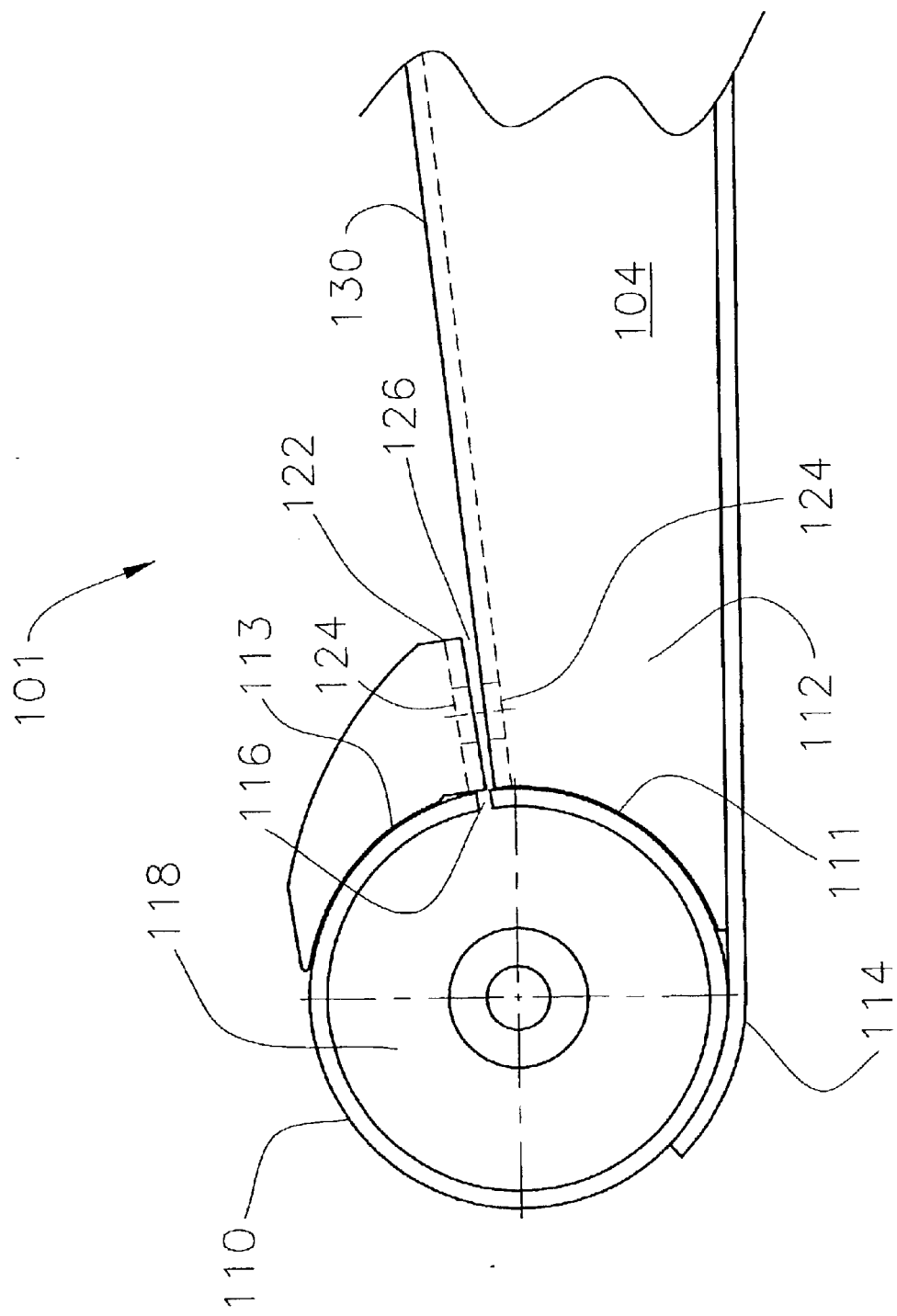
FIG. 3 is a side view of the bush eye clamp, mounting bracket, and control arm arrangement.

Looking at FIG. 2 in conjunction with FIG. 3, the beam and bush attachment assembly 101 of the present invention is shown in detail. The assembly 101 comprises the control arm 104, a bush eye clamp 110 radially attached to a bush end 103 of the control arm 104, and a mounting bracket 122 attached to the bush eye clamp. Both the control arm 104 and mounting bracket 122 have at least one, and preferably two, bores 124 for receiving fasteners 121 therethrough to clamp the control arm and mounting bracket together for securing and compressing a pivotable bush 118, typically made of a hyperelastic material, within the bush eye clamp 110.

The bush eye clamp 110 is preferably made of steel tubing or a rolled sheet of metal that is welded to adjacent suspension side members 112 and tension member 114 at a fixed end 111 of the clamp. The bush eye clamp 110 is positioned such that it is in transverse alignment to the control arm 104 and parallel to the axle 106. In applications where the control arm 104 is in an "overslung" configuration such that the arm overlies and rests upon the axle 106, the tension member 114 is an upper member plate. The bush eye clamp 110 is typically a hollow cylindrical body having an annular cross section such that the cylindrical bush 118 is slidingly received therein. However, if a bush 118 is used having a different shape, the bush eye clamp 110 would have a corresponding cross-section to receive and secure the bush in place. The bush eye clamp has a defined axial slot or gap 116 extending transversely at free end 113 to allow compression of bush 118 when the mounting bracket 122 and control arm 104 are brought into contact with one another by securing fasteners 121.

Figure 4:
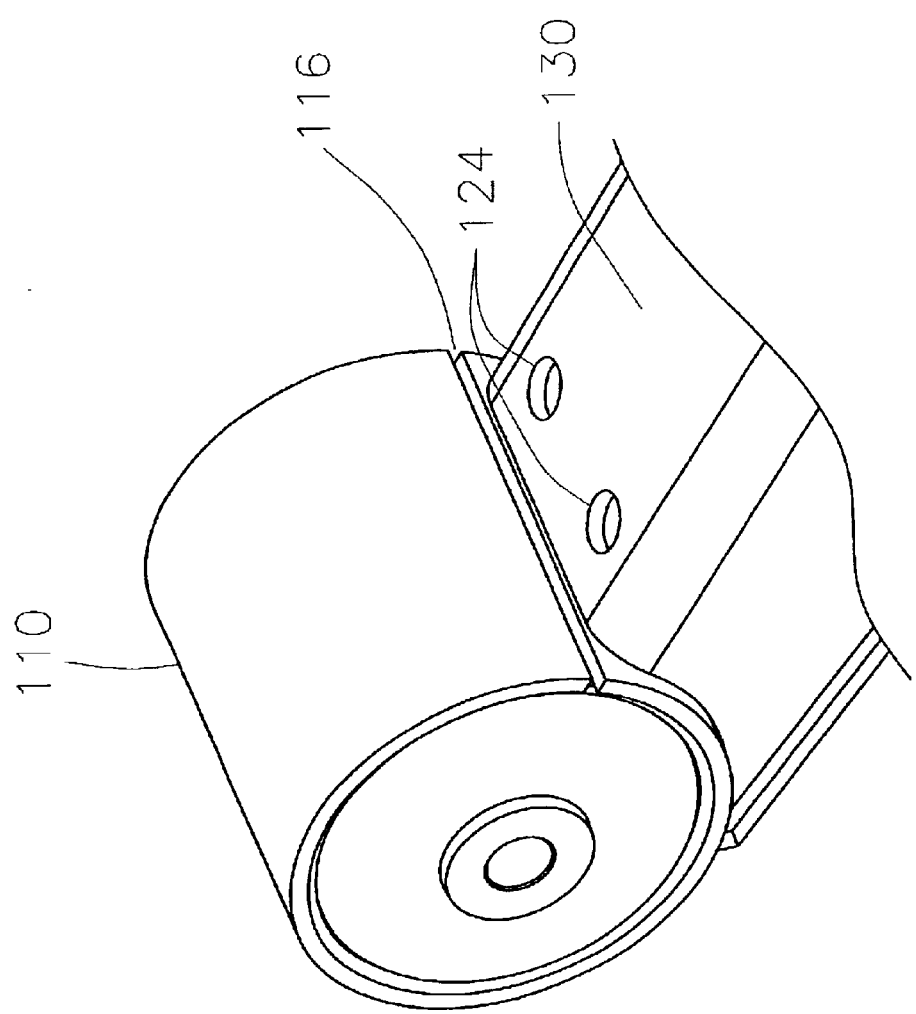
FIG. 4 is an inverted isometric view showing the control arm fastener bores.

The mounting bracket 122 is affixed to the bush eye preferably by welding and preferably has two spaced apart fastener bores 124 that are in substantial alignment with identically sized fastener bores 124 in a beam member plate 130 of the control arm 104, as shown in FIG. 4. However, a single bore 124 could be provided in each of the mounting bracket 122 and beam member plate 130 if a single fastener would have sufficient strength to maintain the position of the bush 118 within the bush eye clamp 110. The fastener bores 124 are generally aligned orthogonal to the bush eye clamp 110 axis. The mounting bracket 122 comprises a transverse flange 123 in parallel alignment with the axial slot 116 and gussets 125 extending at an angle to the flange to reinforce and strengthen the brackets when under stress from the bush eye clamp 110 compressing and securing the bush 118 therein. Preferably, the gussets 125 extend orthogonally to the transverse flange 123 and circumferentially around a portion of the bush eye clamp 110.

The beam member plate 130 of the control arm 104 is preferably a flat, planar member such that the transverse flange 123 of the mounting bracket 122 and the beam member plate abut each other in a mating relationship upon fasteners 121 being secured through fastener bores 124, as shown in FIG. 3. Preferably, the fasteners 121 are bolts 128 with corresponding nuts 120, but any suitable fastener may be used so long as such fastener can adjustably bring mounting bracket 122 and beam member plate 130 together to substantially close the axial slot 116 of the bush eye clamp 110. Also, each of the fastener bores 124 of the mounting bracket 122, and of the beam member plate 130, are preferably the same distance from the axial slot 116 (i.e., in transverse alignment) such that they each impart an equal compressive force transversely across the bush eye clamp 110 to ensure that the bush 118 is secured evenly and not subject to any lateral forces.

Referring to FIG. 3, the mounting bracket 122 has a predetermined gap 126 that is sized such that when the bracket is forcibly closed upon beam member plate 130 after tightening of fastener nut 120 and bolt 128, to bias the axial slot 116, into a substantially closed position, the transverse flange 123 abuts the beam member plate 130 in a mating relationship and the bush 118 is held with sufficient force such that it will not slide laterally out of the bush eye clamp 110. This configuration provides a large surface contact area between the mounting bracket 122 and the control arm 104 to improve force load transmission between the bush eye clamp 110 and the control arm 104.

To access the fasteners 121 for insertion and removal thereof from the fastener bores 124, an aperture 132 is provided in the tension member 114 and is preferably aligned with the fastener bores of the opposing beam member plate 130. The aperture 132 is preferably of a sufficient diameter as to allow access with standard tools to the fasteners 121 extending through the fastener bores 124. When the control arm 104 is in an "overslung" configuration, the aperture 132 is positioned above the fastener bores 124 of the beam member plate 130. However, if it is desired to have an "underslung" configuration, the beam member plate 130 and fastener bores 124 would be positioned above the tension member 114 and aperture 132. Also, if the control arm 104 is an open cross section such that the fasteners 121 can be accessed from opposing sides, then the aperture 132 is not necessary.

The beam and bush attachment assembly 101 of the present invention ensures that sufficient clamp load exists between mounting bracket 122 and the beam member plate 130 and that the bush 118 is retained within the bush eye 110 when lateral loads are imposed on the bush. By use of the single bracket 122 and fasteners 121 along with the bush eye clamp 110, the assembly 101 provides weight savings over prior art suspension system designs, reducing costs and inducing less force loads on the vehicle chassis 100. Also, the common use of the beam member plate 130 to provide load-carrying capability for the control arm 104 and the free end 113 of the clamp reduces the need for additional, costly platework. Field replacement of the bush 118 is easily accomplished with ordinary tools and inexpensive fasteners that reduces vehicle down time and cost.

By way of use, a properly sized bush 118 is slid into the bush eye clamp 110, the axial slot 116 ensuring that the bush eye clamp inner diameter is slightly larger that the bush diameter. Then, fasteners 121, such as bolts 128, are inserted through aperture 132 in the tension member 114 and through the fastener bores 124 of the beam member plate 130 of the control arm 104 and of the mounting bracket 122. Nuts 120 are then secured to the bolts 128 and tightened until the mounting bracket 122 abuts the beam member plate 130 and the axial slot 116 is significantly closed such that the inner diameter of the bush eye clamp 110 is essentially the same as the diameter of the bush 118 and an interference, compression fit is formed. The bush eye clamp is then connected to the hanger bracket 102 by inserting a fastener axially through the center of the bush 118 and the hanger bracket to secure the bush end 103 of the control arm 104 to the chassis 100. These steps can be reversed to remove a bush 118 for replacement.

Having specifically described illustrative embodiments of the invention with reference to the accompanying drawings, it is to be understood that the invention is not limited to those precise embodiments and that various changes and modifications may be effected therein by one skilled in the art without departing from the scope and spirit of the invention as defined in the appended claims.

What is claimed is:

1. A suspension beam and bush attachment assembly comprising:

a longitudinally extending closed beam control arm having a bush end, a mid-region, and an axle mount formed on an opposite side of the mid-region from the bush end, the control arm having at least one fastener bore;

a bush eye clamp transversely mounted to the bush end of the control arm, the clamp having a center bore configured for receiving a bush therein and an axial slot biasing the bushing eye clamp open for bush insertion;

a bracket mounted to the bushing eye clamp and having at least one fastener bore substantially aligned with the at least one fastener bore of the control arm;

an aperture formed in the control arm aligned with and opposing the at least one fastener bore of the control arm to facilitate access to each fastener inserted therethrough; and whereby the bush is compressively fit within the bushing eye clamp by securing a fastener through each of the at least one fastener bores of the bracket and control arm to couple the bracket to the control arm and bias the axial slot into a substantially closed position to contact and compress a perimeter of the bush with the bush eye clamp.

2. The suspension beam of claim 1, wherein the at least one fastener bore of the control arm comprises two fastener bores in transverse alignment with one another, and the at least one fastener bore of the bracket comprises two fastener bores in transverse alignment with one another.

3. The suspension beam of claim 1, wherein the at least one fastener bore of the control arm is disposed in the mid-region.

4. The suspension beam of claim 1, wherein the bracket comprises a transverse flange in parallel alignment with the axial slot of the bushing eye clamp and having the at least one fastener bore extending therethrough and a pair of gussets extending at an angle from the transverse flange, the transverse flange and the pair of gussets extending orthogonally from the bushing eye clamp.

5. The suspension beam of claim 4, wherein the gussets are generally circumferentially aligned with the bushing eye clamp.

6. The suspension beam of claim 4, wherein the at least one fastener bores of the bracket and control arm are aligned orthogonally to the center bore of the bushing eye clamp.

7. The suspension beam of claim 4, wherein the bracket transverse flange is mounted to the bushing eye clamp at a distance from the control arm such that when the bracket is coupled to the control arm to bias the axial slot into a substantially closed position, the transverse flange abuts the control arm in a mating relationship.

8. The suspension beam of claim 1, wherein the aperture of the control arm is formed on a top surface of the control arm and the at least one fastener bore of the control arm is formed on a bottom surface of the control arm.

9. A suspension beam and bush attachment assembly comprising:

a longitudinally extending closed beam control arm having a bush end, a mid-region, and an axle mount formed on an opposite side of the mid-region from the bush end, the control arm having a pair of bores extending through a member plate in a direction orthogonal to the control arm longitudinal dimension;

a bushing eye clamp formed at the bush end of the control arm with a hollow bore extending transversely therethrough for receiving a bush, the clamp having a fixed end attached to the control arm and a free end proximate the pair of bores;

an aperture formed in the control arm aligned with the free end of the clamp and the pair of bores; and a generally U-shaped bracket mounted proximal to the free end of the bushing eye clamp and having a pair of bores extending through a base section of the bracket and substantially aligned with the pair of bores of the control arm such that when a bush is placed within the bushing eye clamp hollow bore and fasteners are secured through the pair of bores of both of the control arm and the bracket to couple the bracket to the control arm, the bush is compressively retained within the bushing eye clamp.

\* \* \* \* \*